Sept. 4, 1951 K. A. W. KEMP 2,566,728
HYDRAULIC GOVERNOR
Filed Feb. 28, 1949
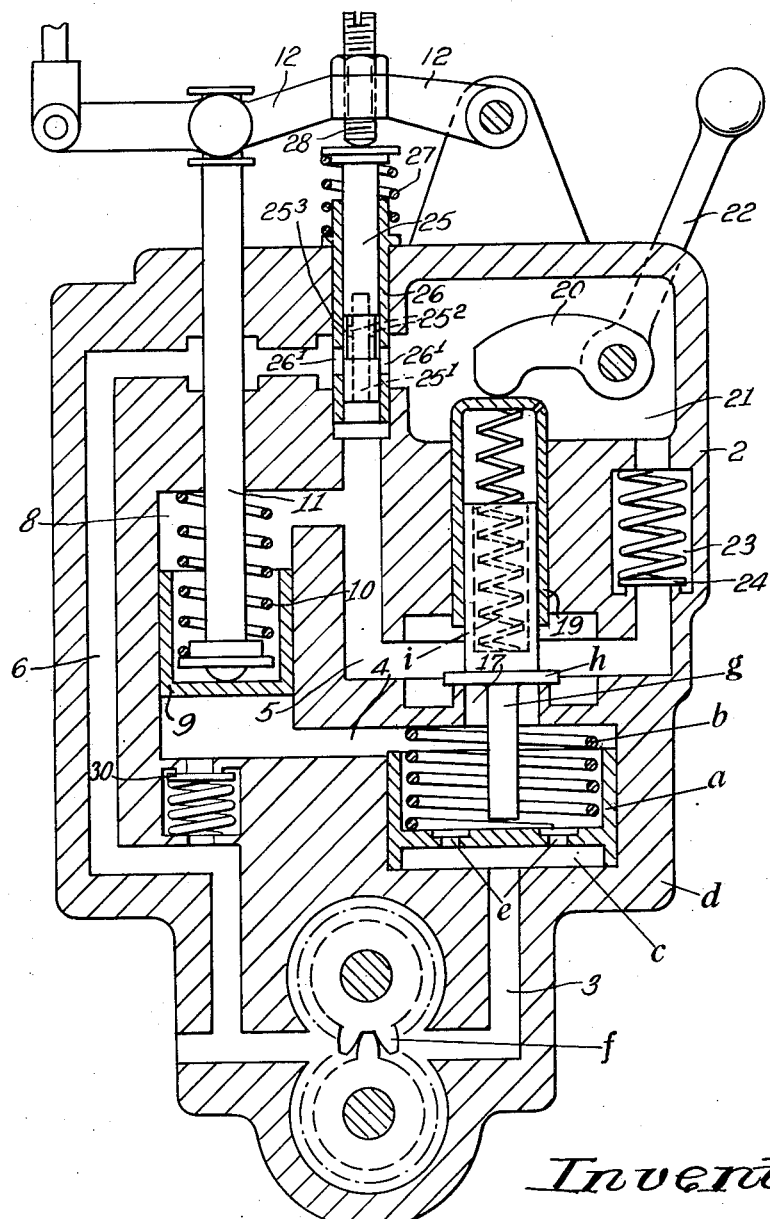
Inventor
K. A. W. Kemp Patented Sept. 4, 1951

2,566,728

UNITED STATES PATENT OFFICE 2,566,728

HYDRAULIC GOVERNOR

Kenneth Albert Walters Kemp, Milton, near Gravesend, England, assignor to C. A. V. Limited, London, England Application February 28, 1949, Serial No. 78,875
In Great Britain March 23, 1948

1 Claim. (Cl. 264—14)

This invention relates to a hydraulic governor for controlling the rate of supply of liquid fuel to an internal combustion engine in response to variations in the speed of the engine.

In United States Patent No. 2,481,334 there is described and claimed an invention which comprises the combination of a liquid circulating pump adapted to be driven by the engine, a circulatory system associated with the pump, a movable member responsive to the liquid pressure in the system for actuating the regulating means of an injection pump for supplying liquid fuel to the engine, a control valve loaded by a manually variable spring for controlling the flow in the said system, a variable choke for controlling the pressure in the system when governing below a predetermined speed, the choke being automatically variable in response to movement of the said movable member, and a valve adapted to by-pass the choke when governing above the said predetermined speed.

In the particular embodiments of the invention described in the patent above mentioned the control valve is supported on a piston having therein an orifice or orifices through which the liquid from the circulatory pump can flow with an appropriate pressure drop which is a function of the speed, movement of this piston serving to actuate the control valve.

For some purposes it is required that the governor shall control automatically only the idling speed and a predetermined maximum speed of the engine, and the present invention is concerned with a modification of the governor forming the subject of the above mentioned patent, for enabling this requirement to be met in a simple and satisfactory manner.

The modification consists of a spring loaded piston adapted to move independently of the associated control valve within appropriate limits.

The accompanying diagram illustrates one mode of carrying the modification into effect.

The governor shown in the drawing comprises a body part 2 having formed in it a plurality of passages 3, 4, 5 and 6, these passages forming parts of a circulatory system through which liquid can flow under the action of any convenient rotary pump, such as a gear pump $f$, adapted to be driven by an internal combustion engine. In the system is formed a cylindrical chamber 8 which communicates at one end with the passage 4, and at the other end with the pasage 5. The chamber 8 contains a piston 9 (hereinafter referred to as the regulating piston) which is loaded by a spring 10, and from which extends a rod 11 having its outer end connected to a lever 12, the latter being adapted to actuate the usual regulating means of another pump (not shown) which supplies liquid fuel to the engine. Also between the circulating pump $f$ and the chamber 8 is formed a second cylindrical chamber $c$ which at one end is connected by the passage 3 to the delivery side of the circulating pump, and at the other end is connected by the passage 4 to the corresponding end of the first chamber 8. The second chamber $c$ contains a hollow piston $a$ having in its end an orifice or orifices $e$ through which the liquid from the circulating pump can flow with an appropriate pressure drop which is a function of speed. The piston $a$ is adapted to act on the lower end of a stem $g$ depending from a valve $h$ which serves by co-operation with a seating at one side of a part 17 to control communication between the passages 4, 5, and thus to control the flow of liquid in the system. The valve $h$ is loaded by a spring $i$ which is contained in a hollow extension of the valve and a hollow cylindrical member 19 which serves as a guide for the valve. The upper end of the cylindrical guide member 19 is closed and bears against a cam-like lever 20 which serves by its action on the guide member to determine the force exerted by the spring $i$ on the valve $h$. The cam-like lever 20 is mounted in a by-pass chamber 21 in the body part 2, and is operable by a hand lever 22. The chamber 21 communicates with one end of the passage 6 which at its other end communicates with the suction side of the pump $f$. The chamber 21 is also connected to the passage 5 by another passage 23 which is controlled by a spring loaded valve 24, the latter being adapted to open automatically when the pressure in the passage 5 reaches a predetermined limit. The chamber 21 and the passage 23 form a by-pass between the passages 5, 6. Also in parallel with this by-pass 21, 23 is arranged a variable choke consisting of a piston valve 25 which is slidable in a sleeve 26 and is loaded by a spring 27. The piston valve 25 is formed with an axial bore $25^1$, and with lateral ports $25^2$ interconnecting the bore and a circumferential groove $25^3$ around the exterior of the valve, the bore being closed at one end and being in free communication at the other end with the passage 5. The sleeve 26 in which the piston valve 25 is slidable, is formed with lateral ports $26^1$ for connecting the groove $25^3$ in the piston valve to the passage 6 and chamber 21. The outer end of the valve 25 is in contact with an adjustable abutment 28 on the above mentioned lever 12 which transmits movement to the regulating means of the fuel pump. The variable choke serves to control direct communication between the passages 5, 6. Further there is provided between the passages 4, 6 a spring-loaded relief valve 30.

The orificed piston $a$ is loaded by a spring $b$ which tends to move the piston towards one of its limit positions, which position is occupied by the piston when the engine is at rest or running at idling speed. The stem $g$ of the associated valve $h$ (which is loaded by the spring $i$) is made such that the piston only comes into contact with the stem when the piston approaches its other limit position at the predetermined maximum speed of the engine. When in this position a small further movement of the piston serves to open the valve $h$.

The arrangement and mode of operation of the hydraulic governor above described are as follows:

On starting the engine (by, for example, a starting motor) the cam-like lever 20 occupies the extreme position shown in which it imposes a minimum closing pressure on the first valve $h$ through the medium of the spring $i$. The circulating pump $f$ now causes liquid under pressure to pass through the orifice or orifices $e$ in the hollow piston $a$ to the lower side of the regulating piston 9 and moves the latter in opposition to its spring 10. As the quantity of liquid delivered by the circulating pump $f$ during starting of the engine is small, the pressure drop across the orifice or orifices $e$ is also small, and in consequence no movement is imparted to the hollow piston $a$. Moreover, the liquid pressure is insufficient to move the valve $h$, but is sufficient to move the piston 9 for actuating the fuel pump regulating means so as to cause the fuel pump to give its maximum discharge. When the engine begins to rotate under its own power, the liquid pressure acting on the first valve $h$ increases sufficiently to open this valve, thereby allowing access of liquid to the upper side of the regulating piston 9 through the passage 5. The consequent rise of pressure on the upper side of the regulating piston 9 assists the spring 10 to return the regulating piston to a new position of equilibrium in which the rate of supply of fuel from the fuel pump is reduced to an amount corresponding to the idling requirements of the engine. This movement of the regulating piston 9 causes opening movement to be simultaneously transmitted to the piston valve 25 of the variable choke through the lever 12, and the consequent liquid flow past this valve controls the liquid pressure acting on the upper side of the regulating piston when the engine is idling. If the cam-like lever 20 is now moved in a counter-clockwise direction to its other extreme position in which it imposes a maximum closing pressure on the first valve $h$ through the medium of the spring $i$, this valve cannot be opened by the liquid pressure at the upper side of the hollow piston $a$ since the above mentioned relief valve 30 between the passages 4, 6 opens before this pressure reaches a value sufficient to open the first valve. However, when the engine approaches a predetermined maximum speed the pressure drop across the orifice or orifices $e$ in the hollow piston $a$ causes this piston to move against the action of its loading spring $b$ into contact with the stem $g$ of the second valve $h$ for opening this valve. Consequently the difference in the liquid pressures at opposite sides of the regulating piston 9 will decrease sufficiently to allow the spring 10 to move the regulating piston into a new position of equilibrium. When the pressure in the passage 5 reaches a predetermined limit, the valve 24 opens against the action of its spring loading, and thus enables liquid to flow from the passage 5 to the passage 6 through the by-pass chamber 21.

By the provision above described the governor operates automatically on the regulating means of the fuel injection pump only at the idling and maximum speeds of the engine, actuation of the said means at speeds between those limits being effected by a throttle or other means under the control of the driver.

Having thus described my invention what I claim as new and desire to secure by Letters Patent is:

A hydraulic governor comprising a liquid circulating pump having an inlet and an outlet, a delivery passage communicating with said outlet, a return passage communicating with said inlet, a third passage forming with said delivery passage and said return passage a liquid circulatory path between said inlet and outlet, a main valve movable by liquid pressure under the action of said pump for establishing communication between said delivery passage and said third passage, a manually variable loading spring opposing opening movement of said main valve, a chamber communicating at opposite ends with said delivery passage and said third passage respectively, a spring loaded movable member arranged in said chamber so as to be responsive to liquid pressures in said delivery passage and third passage, a variable choke for establishing communication between said third passage and said return passage, means for varying said choke in response to movement of said movable member, a by-pass for establishing communication between said third passage and said return passage independently of said choke, a piston arranged to move towards and then to act on said main valve under the liquid pressure in said delivery passage, said piston being provided with at least one orifice through which liquid can flow, and a loading spring opposing movement of said piston by liquid pressure.

KENNETH ALBERT WALTERS KEMP.

REFERENCES CITED

The following references are of record in the file of this patent:

UNITED STATES PATENTS

| Number | Name | Date |
|---|---|---|
| 2,481,334 | Nicolls | Sept. 6, 1949 |

FOREIGN PATENTS

| Number | Country | Date |
|---|---|---|
| 589,722 | Great Britain | June 27, 1947 |